US005361658A

United States Patent [19]

Murphy

[11] Patent Number: 5,361,658

[45] Date of Patent: Nov. 8, 1994

[54] HOSE GUIDE TOOL

[76] Inventor: James K. Murphy, 2245 Botany St., Middleburg, Fla. 32068

[21] Appl. No.: 130,864

[22] Filed: Oct. 4, 1993

[51] Int. Cl.[5] .......................... B25B 33/00; B65G 7/12

[52] U.S. Cl. .......................................... 81/487; 81/488; 294/15

[58] Field of Search .......................... 81/488, 487, 8.1; 294/15, 26

[56] References Cited

U.S. PATENT DOCUMENTS 1,486,230 3/1924 Cox ...................................... 81/487
3,443,460 5/1969 Johnston, Jr. ......................... 81/8.1
4,655,492 4/1987 Landry ................................. 294/15
4,911,041 3/1990 Jones et al. .......................... 81/487

*Primary Examiner*—Roscoe V. Parker
*Attorney, Agent, or Firm*—Arthur G. Yeager; Earl L. Tyner

[57] ABSTRACT

A hand tool adapted to guide a rubber hose being wound on a reel, the tool being T-shaped with the cross bar as a handle and the stem having at its distal end a helix designed to be easily connected to the hose such that the hose runs lengthwise along the axis of the helix.

3 Claims, 2 Drawing Sheets

HOSE GUIDE TOOL

BACKGROUND OF THE INVENTION

There are many occasions when a flexible, elongated, funicular structure, such as a rope, a hose, a cable, or the like is wound onto a reel without having an automatic mechanical guide to feed the structure onto the reel in an automatic fashion. In such cases a person usually allows the structure to pass through his hands which are moved to guide the incoming structure close to the preceding layer on the reel. If the reel runs fast the hands should he in gloves to prevent frictional burning. Even gloves cannot last through very many of such instances. If the frictional forces are high and/or the speed of the reel is high, the heat developed by the hose or rope can be very serious, even to producing a fire.

It is an object of this invention to provide a hand tool to guide a moving hose, cable, or the like onto a reel. It is another object of this invention to provide a T-shaped tool having a helix adapted to be easily attached to an elongated flexible structure being wound onto a reel. Still other objects will become apparent from the more detailed description which follows.

BRIEF SUMMARY OF THE INVENTION

This invention relates to a hand tool for guiding an elongated flexible funicular structure during its lengthwise movement, said tool comprising a handle connected to a helical coil having a central axis spaced apart from said handle and including about 1⅛ to 1½ turns at a diameter of at least 1¼ times the diameter of said funicular structure, and at a pitch at least equal to the diameter of said funicular structure.

In specific and preferred embodiments of this invention the tool is in the shape of a T with the crossbar being a rod adapted to be gripped in the hand of the user, and the stem of the T terminating at a distance away from the cross bar in a helix through which the funicular structure can move lengthwise, the diameter and the pitch of the helix being 1⅛–1½ times larger than that of the structure and the number of turns in the helix being about 1⅛–1¼.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features and structures of the hand tool of this invention are best understood by reference to the attached drawings.

Figure 3:
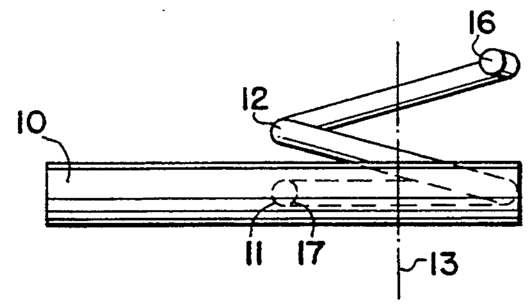
FIG. 3 is a top plan view of the hose guide tool of this invention.
Figure 1:
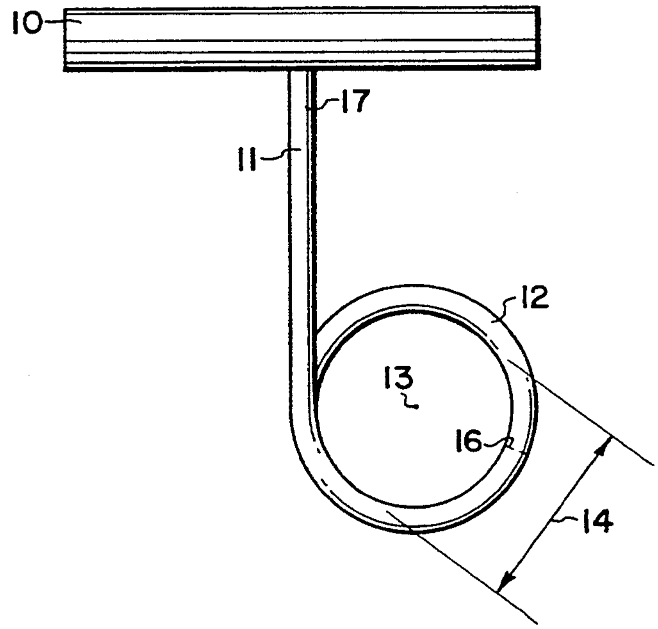
FIG. 1 is a front elevational view of the hose guide tool of this invention.
Figure 2:
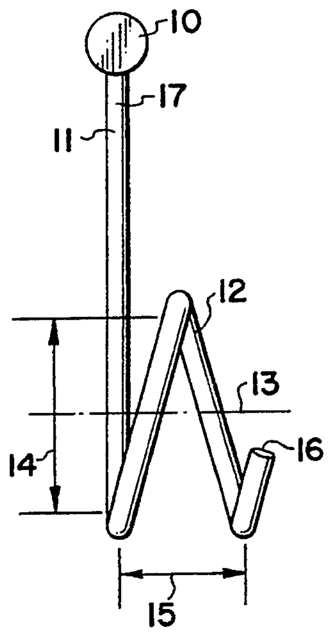
FIG. 2 is side elevational view of the hose guide tool of this invention.

In FIGS. 1–3 the tool is shown in three views. The hand tool has two parts that are joined together to produce a single, integral, rigid structure generally having a T-shape. The tool has a handle 10 which is the cross bar of the T and an arm 11 which is the stem of the T. Handle 10 is of any size and shape that is comfortably held in the hand of the user. The simplest handle is that shown; i.e., a cylindrical bar large enough in diameter and long enough longitudinally to be comfortable in the grip of a hand. The normal size may be 0.25 to 0.75 inch in diameter and 4 to 6 inches long. The handle 10 need not be straight, but could be curved. The shape could be like a pistol grip, or an enclosed oval such as that found on hand saws, with or without individual finger recesses. Any shape of handle is usable in the context of this invention.

Arm 11 is rigidly attached to handle 10 at whatever angle and position with respect to handle 10 that is desired. The simplest form is shown here to be perpendicular to handle 10 and attached at the midpoint of handle 10. Arm 11 can be of smaller diameter than handle 10, e.g., about half the size of handle 10. Arm 11 has a proximal end 17 and a distal end 16. Proximal end 17 is attached to permit a flexible funicular structure to run through helix 12 in the general direction of the helix axis 13. The funicular structure is any reelable, endless member that has a length to diameter (l/d) of very large proportions, e.g., at least 100. Such structures include ropes, cables, hose, and the like.

Figure 4:
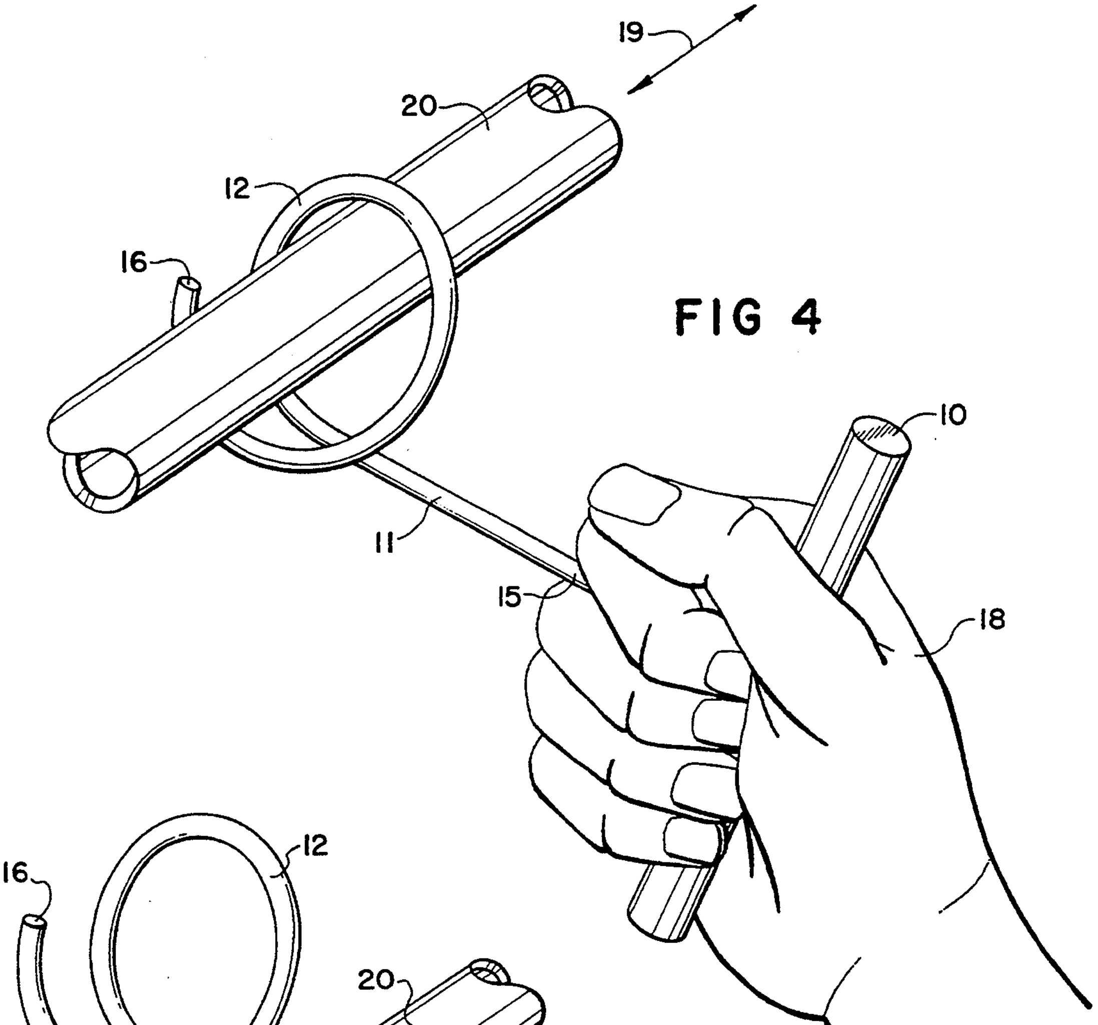
FIG. 4 is a perspective view of the hose guide tool in use guiding a hose onto a reel.

The specifics of the helix depend on the size of the funicular structure to be handled. The interior diameter 14 of helix 12 must be larger than the exterior diameter of the funicular structure, and preferably at least about 1¼ times the diameter of the funicular structure. The largest internal diameter 14 is not critical, but it becomes inconvenient when that diameter is more than about 2 times the diameter of the funicular structure. Thus with a rubber hose of one inch outside diameter the helix inside diameter should be from about 1.25 to 2.0 inches. The pitch of a coil is the linear distance, parallel to the axis of the coil between similar locations on the coil representing one complete turn of the coil. In FIGS. the pitch 15 of helix 12 is shown, and should be at least equal to the diameter of the funicular structure and preferably not more than about 2 times the diameter of the funicular structure. Thus for use with the one-inch 0.0 hose mentioned above, the pitch should be about 1–2 inches. Finally, the length of helix 12 should be specified by the number of complete turns in the helix. In this invention the number of turns is important because the ease of attaching the tool to the funicular structure depends on this feature. The number of turns should be from about 1 to about 1½ turns. In FIG. 4 the hand tool is shown being held by the hand 18 of the user with a hose member 20 running in either direction of double arrow 19. It may be seen that by pushing or pulling on the hand tool it may be guided to the right or left of its running direction 19.

Figure 5:
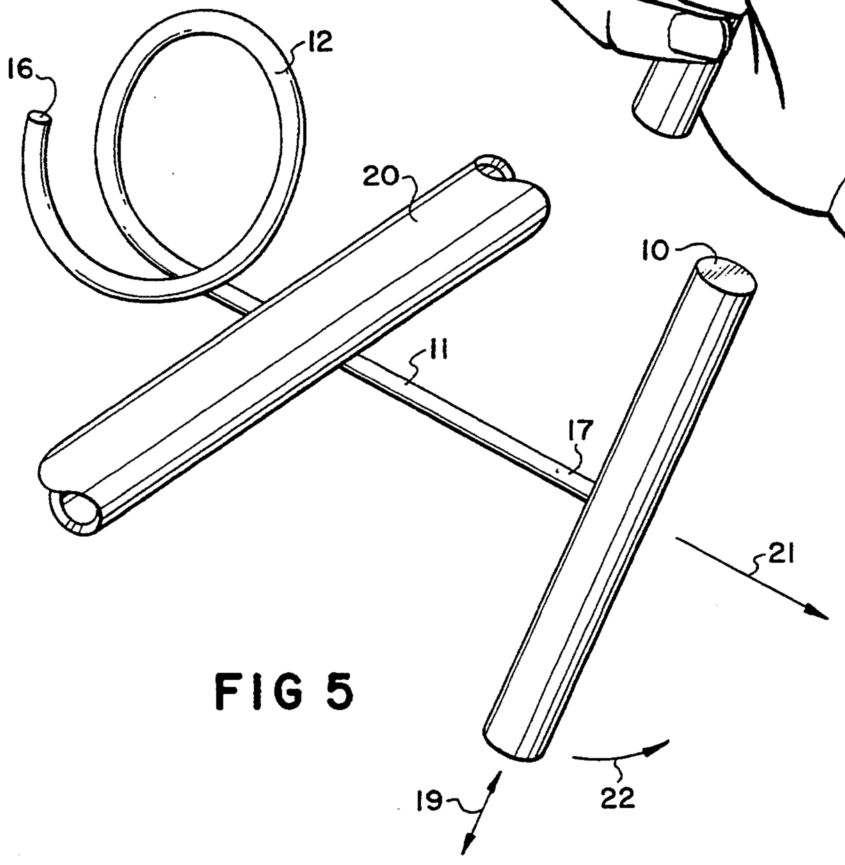
FIG. 5 is a perspective view showing how the hand tool of this invention is attached to a running hose for purposes of guiding the hose onto a reel.

In FIG. 5 there is an illustration of how the hand tool may be attached to hose 20 while hose 20 is moving in the direction 19. There is, of course, no problem in attaching the hand tool while the hose is stationery.

Hose 20 may merely by threaded through the center of the helix 12 in the direction of axis 13 if the internal diameter 14 of helix 12 is large enough. If there is a nozzle on the end of hose 20, that procedure may be inoperable. A second procedure is to turn the helix 12 sidewise so as to slide hose 20 between adjacent turns of the helix 12, and then twist handle 10 and bend hose 20 around a turn or two until it is positioned along helix axis 13 as shown in FIG. 4. When hose 20 is moving that same procedure is employed to attach the tool to hose 20, but it is important for all size ratios of diameters, pitch, and number of turns to be as specified above. Otherwise it will be substantially impossible to accomplish. As shown in FIG. 5, helix 12 is held beyond hose 20 with handle 10 in the hand of the user. The tool is then pulled closer to the user in the direction of arrow 21 until hose 20 rubs against the helix and prevents any further movement of the tool in the direction of arrow 21. Tool handle is then rotated in the direction of arrow 22 until distal end 16 of helix 12 passes under hose 20 and the tool is in the position shown in FIG. 4. In order for this method of attachment to work smoothly and easily there must be not more than $1\frac{1}{4}$ turns or distal end 16 will not be able to be easily twisted sufficiently to allow hose 20 to fall into place. If there are not enough turns, i.e., less than about $1\frac{1}{8}$ turns, distal end 16 will not wrap around hose 20 far enough to provide a smooth surface for holding hose 20 in line for guiding. Of course, the pitch 15 of the helix 12 must be at least as large as the outside diameter of hose 20 so as to permit the first movement 21 to grasp hose 20.

It is not critical that the hand tool of this invention be made of any particular material, so long as that material can be heated by friction and not lose its helical shape. Stainless steel is a preferred material that has the appropriate strength and also is noncorrosive. A disadvantage of stainless steel is that it will during use become warm by reason of conduction of heat developed in the helix by reason of the friction of the passing rubber hose. Thermosetting plastics, e.g., glass fiber-filled polyester has a good strength, is non-corrosive, and also is a reasonably good heat insulator, which would reduce the conduction of heat from the frictional heat at the helix to the handle. Other materials or combinations can be employed.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A stainless steel hand tool adapted to guide a rubber hose being rapidly wound onto a roll, said tool having a general T-shape with the cross bar of the T being a short length of a large diameter rod and functioning as a handle capable of being gripped by the hand of the user, and the stem of the T being a small diameter rod having a proximate end rigidly connected at a right angle to said cross bar and formed into a helix at a distance spaced apart from said handle, said helix having $1\frac{1}{8}$–$1\frac{1}{2}$ turns at a diameter about $1\frac{1}{2}$ times the diameter of said hose and at a pitch of 1–$1\frac{1}{2}$ times the diameter of said hose.

2. The tool of claim 1 wherein said handle is a rod about $\frac{1}{2}$ inch in diameter and 5–6 inches long, and said stem being about $\frac{1}{4}$ inch in diameter with said helix having a diameter of about $1\frac{1}{2}$ inches and with said central axis being spaced apart from said handle about 4–5 inches.

3. A hand tool for guiding an elongated flexible funicular structure during its lengthwise movement, said tool comprising a short larger diameter rod functioning as a handle and a length of smaller diameter rod connected perpendicular to said handle and formed into a helical coil with a central axis spaced apart from said handle so as not to interfere with the hands of the user gripped around said handle; said coil having $1\frac{1}{8}$ to $1\frac{1}{2}$ turns along said central axis, the diameter and pitch of said coil being at least one inch in size.

* * * * *